United States Patent [19]
Lay et al.

[11] Patent Number: 5,813,687
[45] Date of Patent: Sep. 29, 1998

[54] SPARE WHEEL ASSEMBLY FOR TRAILERS

[75] Inventors: Alvin Loise Lay, Cantonement; Charles E. Benedict, Tallahassee, both of Fla.

[73] Assignee: EZ Way, Inc., Pensacola, Fla.

[21] Appl. No.: 629,137

[22] Filed: Apr. 8, 1996

[51] Int. Cl.⁶ .............................. B60P 3/10; B62D 63/08; B62D 61/12
[52] U.S. Cl. ...................... 280/414.1; 280/767; 280/475; 301/132
[58] Field of Search .............................. 280/414.1, 414.2, 280/414.3, 475, 763.1, 767, 414.5, 43, DIG. 8, 766.1, 765.1, 764.1; 414/466, 463, 464, 462; 114/344; 254/418; 301/130, 131, 124.1, 132; 224/555, 42.12, 42.21, 539; 248/352, 354.5, 357

[56] References Cited

U.S. PATENT DOCUMENTS

| | | | |
|---|---|---|---|
| 1,163,354 | 12/1915 | Meiners | 280/767 |
| 1,559,541 | 11/1925 | Ballentine . | |
| 2,446,321 | 8/1948 | Bartholomew . | |
| 2,613,955 | 10/1952 | White | 280/767 |
| 2,810,588 | 10/1957 | Rozett | 280/414.1 |
| 2,811,386 | 10/1957 | Shaw . | |
| 2,834,608 | 5/1958 | Wixson | 280/767 |
| 3,004,772 | 10/1961 | Bohlen et al. . | |
| 3,039,633 | 6/1962 | Mindrum et al. . | |
| 3,101,202 | 8/1963 | Tantlinger et al. . | |
| 3,158,881 | 12/1964 | Clausen | 114/344 |
| 3,190,674 | 6/1965 | Carter | 280/767 |
| 3,217,478 | 11/1965 | De Geere | 280/767 |
| 3,332,699 | 7/1967 | Devys . | |
| 3,348,860 | 10/1967 | Buckles | 280/414.1 |
| 3,348,861 | 10/1967 | Curtis et al. | 280/414.1 |
| 3,520,377 | 7/1970 | Wallace | 301/132 |
| 3,529,850 | 9/1970 | Montalto . | |
| 3,655,220 | 4/1972 | Rodgers . | |
| 3,869,149 | 3/1975 | Dixon . | |
| 3,879,058 | 4/1975 | Horn . | |
| 4,219,213 | 8/1980 | Butcher . | |
| 4,266,796 | 5/1981 | Riggs et al. | 280/414.1 |
| 4,307,894 | 12/1981 | Habeshian . | |
| 4,511,174 | 4/1985 | Walker . | |
| 4,648,617 | 3/1987 | Hannappel . | |
| 4,779,889 | 10/1988 | Morrison . | |
| 4,824,133 | 4/1989 | Wilson . | |
| 5,013,058 | 5/1991 | Kruger . | |
| 5,137,297 | 8/1992 | Walker . | |
| 5,161,814 | 11/1992 | Walker . | |
| 5,269,593 | 12/1993 | Wasson . | |
| 5,282,605 | 2/1994 | Sauber | 254/424 |
| 5,484,192 | 1/1996 | Degelman | 301/131 |
| 5,560,629 | 10/1996 | Allard et al. | 301/132 |

FOREIGN PATENT DOCUMENTS

| | | | |
|---|---|---|---|
| 464565 | 4/1950 | Canada | 280/766.1 |
| 675276 | 5/1929 | France | 280/767 |

*Primary Examiner*—Douglas C. Butler
*Attorney, Agent, or Firm*—Dowell & Dowell, P.C.

[57] ABSTRACT

An auxiliary wheel assembly for temporarily supporting one side of a trailer frame wherein the assembly includes a wheel carried by a strut which is vertically adjustable relative to a support tube. The assembly also includes clamping elements for securing the tube to and directly beneath the frame without interfering with the structural integrity of the frame.

19 Claims, 5 Drawing Sheets

SPARE WHEEL ASSEMBLY FOR TRAILERS

BACKGROUND OF THE INVENTION

1. Field of the Invention

This invention is generally directed to auxiliary wheels which may be utilized with conventional trailers so as to temporarily make a disabled trailer roadworthy. More particularly, the present invention is directed to an auxiliary wheel assembly which is universally adaptable to a plurality of different conventional sizes and styles of trailers and which is secured to the frames of such trailers by clamping elements which do not adversely affect the integrity of the trailer frames.

2. History of the Related Art

In U.S. Pat. No. 3,879,058 to Horn, a spare wheel is disclosed which is specifically designed to be mounted to trailers in such a manner that the wheel may be moved into supporting position with respect to the trailer frame in the event of a breakdown of a tire, wheel, axle or bearing on either side of the trailer frame. The assembly includes a cross-member and an arcuate bar which are mounted beneath the frame and which carry a short axle which is pivoted centrally of the cross-member and which supports a wheel at its outer end. The wheel and axle are normally locked in an elevated position beneath the trailer frame but may be lowered and swung in either direction along the arcuate bar to brackets positioned on either side of the frame wherein the axle may be locked. The swinging movement of the spare wheel is permitted by elevating the side of the frame at which the wheel is to be positioned.

The spare wheel assembly of Horn recognizes the benefits to be obtained by providing a supplemental wheel for use in enabling trailers to be towed after a tire, wheel, bearing or axle has been damaged. Conventionally, many trailers, especially lightweight trailers utilized to tow vehicles such as boats, are not equipped with a spare tire, replacement bearing or axle. In the event of a flat tire or other mechanical breakdown involving a conventional wheel assembly, it has been necessary to pull the trailer off a travel surface and arrange for repair to be made at the point of breakdown. This requires that repairs be made under hazardous conditions along traveled highways and, in many instances, requires at least a temporary abandonment of the trailer and any vehicle or item being carried by the trailer.

Unfortunately, the spare wheel assembly of Horn requires major modification to a conventional trailer frame. The assembly is quite complex and is designed to be permanently mounted to the frame. As the wheel assembly is permanently mounted to the frame, and beneath the frame, the assembly is subject to becoming damaged by exposure to dirt, rocks, oil, tar and other debris. In addition, trailers utilized to launch and retrieve watercraft are generally submerged into either fresh or salt water in order to float the craft from the trailer. During these periods, further deterioration of the wheel assembly occurs. The wheel assembly is also locked generally centrally beneath the trailer frame in a very hard to reach position. It is therefore difficult for an individual to release the assembly for use in an emergency situation. Further, if the assembly became difficult to maneuver due to its exposure to various elements, releasing of the assembly can be hazardous especially if the assembly is released while the trailer is elevated by a jack.

Other types of spare wheel assemblies have been designed for use with trailers. In most, however, the spare wheel is adapted and mounted to provide support for the tongue of a trailer when the trailer is released from a towing vehicle. Other spare wheel assemblies are designed to be directly bolted to the frame of a trailer. Interfering with the structural integrity of a frame by making openings therethrough can result in premature failure of the frame. Also, such spare wheel assemblies are designed to be generally permanently secured to a frame and are thus continuously exposed to the elements, which is detrimental to the assemblies in a manner as discussed with respect to the wheel assembly of Horn.

A further drawback with prior art spare or auxiliary wheel assemblies for use with trailers is that they are designed to be utilized with specific sizes of trailer frames. If an individual or business owns several sizes of trailers, it is necessary to have separate spare wheel assemblies for each trailer.

SUMMARY OF THE INVENTION

The present invention is directed to a spare wheel assembly for use with trailers which overcomes the deficiencies of the prior art as set forth above and wherein the assembly is designed to be stowed when not in use in a position where it will not become damaged due to exposure to natural elements and wherein it may be placed into use quickly and easily with minimal risk of possible injury to an individual. Further, the spare wheel assembly of the present invention is designed to be universally adaptable to a plurality of differently sized trailers and to be securely mounted to such trailers without adversely affecting the integrity of the trailer frames.

The present invention is directed to a spare wheel assembly for trailers which includes a wheel rotatably mounted to a spindle carried by a vertically adjustable strut. The vertically adjustable strut is selectively adjustable with respect to a support tube which is clamped to a frame member of a trailer in such a manner that the tube is positioned directly beneath and adjacent to the frame member. The mounting tube is provided along its upper portion with a generally L-shaped flange which is engageable against one side of the frame member and which is provided with two spaced sets of at least two vertically spaced openings. At least one clamping plate is also provided having vertically spaced openings therein which are alignable with the openings in the L-shaped flange. A set of four bolts is utilized to secure the clamping plate or plates on the opposite side of the frame member from the L-shaped flange so that the frame is clamped therebetween.

In a preferred embodiment, both the L-shaped flange and the clamping plate or plates are provided with a plurality of upper spaced openings and at least one lower spaced opening. The spacing between the upper openings is designed to allow bolts to be extended therethrough in different spaced relationships with respect to the lower openings to thereby accommodate different sizes of frame members of conventional trailers.

In a preferred embodiment, a pair of sleeves are provided along the base of the L-shaped flange so as to be aligned with the lower openings in the clamping plate or plates. Bolts passing through the lower openings also pass through the sleeves which provide greater rigidity and stability for the mounting components.

Also, in the preferred embodiment, the spindle which extends from the wheel to the mounting strut is angled generally downwardly and outwardly relative to a longitudinal axis of the strut when in a mounted position with respect to the support tube so that a tire carried by the wheel is canted generally inwardly toward a center line of a frame to which the wheel assembly is mounted.

It is a primary object of the present invention to provide a spare wheel assembly for trailers which may be easily clamped to varying sizes of frame members of conventional trailers in such a manner that the assembly is securely and rigidly retained in position when in use.

It is also an object of the present invention to provide a spare wheel assembly which may be utilized to support one side of a trailer frame in the event a tire, wheel, axle or bearing becomes damaged to allow the emergency transport of the trailer to a site where repairs can be safely and conveniently made and wherein the wheel assembly may be mounted to a frame member utilizing a conventional lug wrench so that only tools normally carried by a towing vehicle are necessary to secure the wheel assembly in an operative position.

It is also an object of the present invention to provide a spare wheel assembly for use with trailers which may be stowed in an out-of-the-way position such as within the trunk of a vehicle and which may be readily installed when necessary without first having to lift or elevate the trailer frame. Thus, the assembly can be utilized to provide stability for the trailer after being secured to the frame and as the frame is elevated to shift the weight of the trailer to the wheel assembly.

It is yet another object of the present invention to provide an auxiliary wheel assembly for use with trailers wherein the assembly is clamped to the frame of a trailer in such a manner so as to preserve the structural integrity of the frames.

An additional object of the present invention is to provide an auxiliary wheel assembly for use in the emergency towing of a trailer wherein the assembly is mounted so as to be properly positioned to provide maximum stability for the frame as the trailer is towed.

DESCRIPTION OF THE PREFERRED EMBODIMENT

Figure 1:
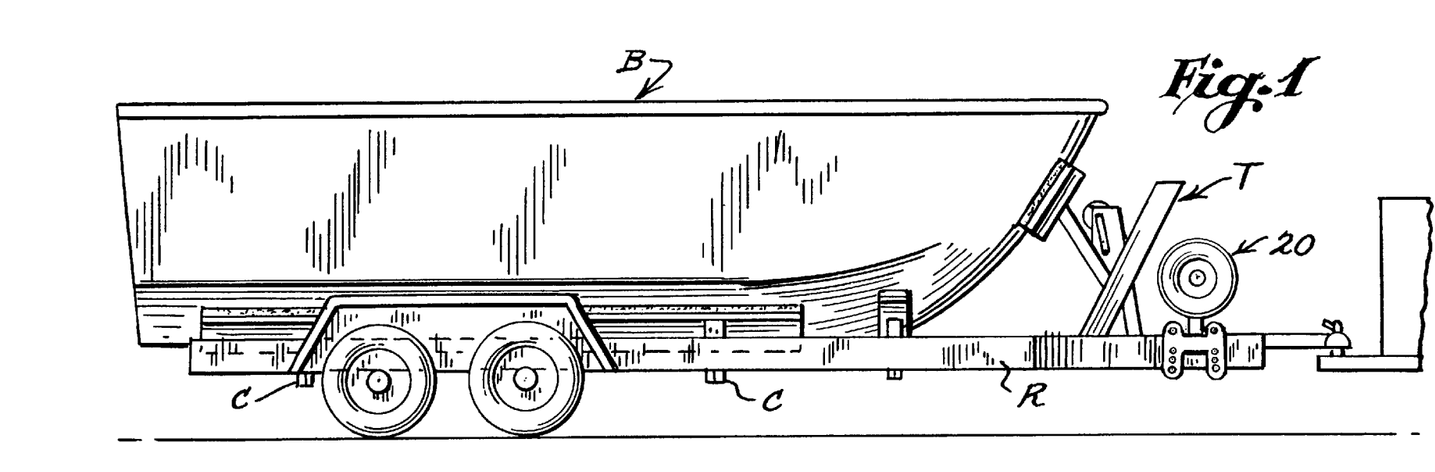
FIG. 1 is a right side elevational view showing the auxiliary wheel assembly of the present invention in one proposed stowed position along the forward portion of a trailer.
Figure 2:
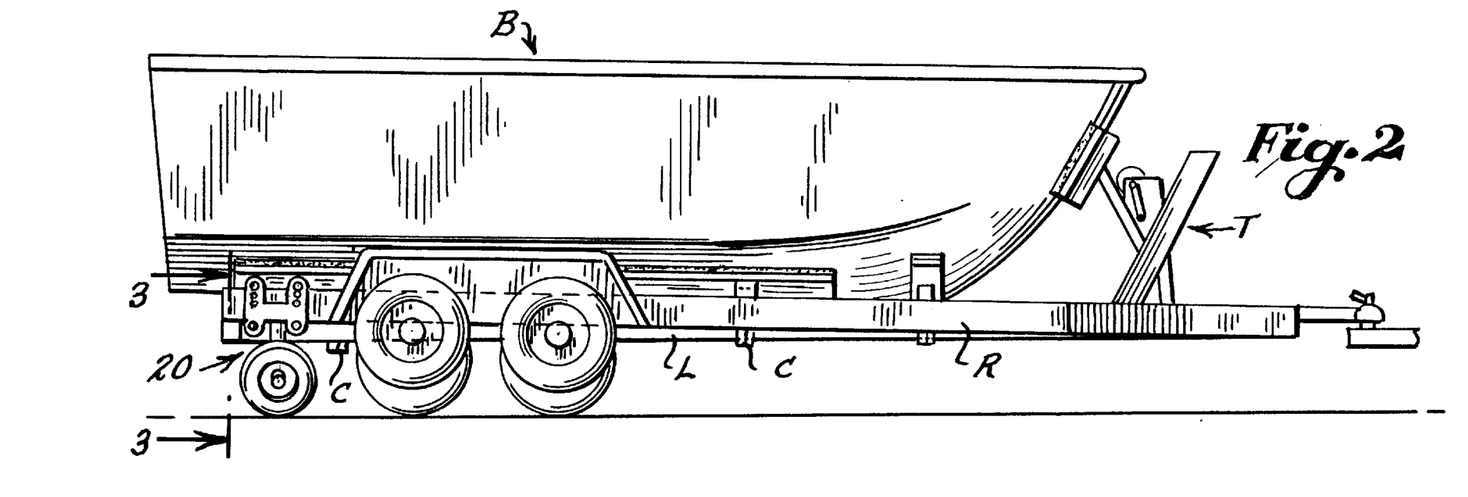
FIG. 2 is a right side elevational view showing the auxiliary wheel assembly of the present invention mounted and extended into an adjusted position supporting the right frame member of the trailer shown in FIG. 1.

With continued reference to the drawings, and as specifically illustrated in FIGS. 1 and 2, the spare or auxiliary wheel assembly 20 of the present invention is designed for use with conventional trailers "T" which normally include left and right side primary frame members "L" and "R" which are reinforced along the length of the trailer by cross components "C". The trailer depicted is a conventional tandem axle trailer for supporting a boat "B". The axles support opposite wheels to which tires are mounted.

In FIG. 1, the auxiliary wheel assembly 20 is positioned in a stored or stowed position adjacent the forward portion of the frame. In the event of a failure of either the tires, wheels, bearings, or axles, the auxiliary wheel assembly is placed into use in a manner as illustrated in FIG. 2 wherein the assembly is secured to the right frame member "R" rearwardly of the affected wheel, tire, bearing or axle. In some instances, the auxiliary wheel assembly may be mounted forwardly of the tires shown in FIG. 2. The manner of mounting the assembly will be discussed in greater detail hereinafter.

With specific reference to FIGS. 3 through 7, a first embodiment of the present invention is disclosed in greater detail. In this embodiment, the auxiliary wheel assembly 20 includes a tire 30 mounted to a wheel hub 31 illustrated in dotted line which is rotatably mounted to a spindle 32 fixedly secured at its outer end to a vertically extending strut 33. In the embodiment shown, the strut 33 is preferably formed of a generally rectangular cross-section hollow tubing although other configurations and cross-sectional structures may be utilized in keeping with the teachings of the present invention. Strut 33 has a plurality of pairs of vertically spaced openings 34 therein for purposes of receiving a locking pin 35 which is secured when placed in use with a conventional cotter pin 36. The spindle 32, in the preferred embodiment, is canted slightly downwardly and outwardly at an angle $\beta$ with respect to the strut 33 to provide stability for the assembly when a load is applied thereto during use. As specifically shown in FIG. 4, the wheel and tire are shown oriented outwardly with respect to frame member "R", however, it is possible that the tire may oriented inwardly relative to frame member "R" when in use.

The strut 33 is telescopically adjustable within a support tube 40 which is also, in the preferred embodiment, a generally rectangular hollow tube complimentary in cross-section to the strut 33. As shown, the strut is frictionally slidable within the tubular support 40. The tubular support includes a reinforced lower end 41 and an upper portion 42. At least one pair of aligned openings 44 are provided through the walls of the tube for receiving the locking pin 35 when the openings 34 in the strut 33 are aligned with one of the sets of openings 44. In this manner, the strut may be extended and retracted relative to the support tube 40 and locked in a selected position appropriate for transporting a trailer in the manner as shown in FIG. 2. As shown, the conventional wheels on the right side of the trailer are elevated slightly off the ground so that the auxiliary wheel assembly carries the weight of the trailer and its load along the frame member "IR".

It should be noted that the support tube 40 may be constructed so as to be received within the strut as opposed to receiving the strut as shown. Also, the support tube or strut may be formed of a solid material with the openings drilled or otherwise provided therethrough.

Figure 3:
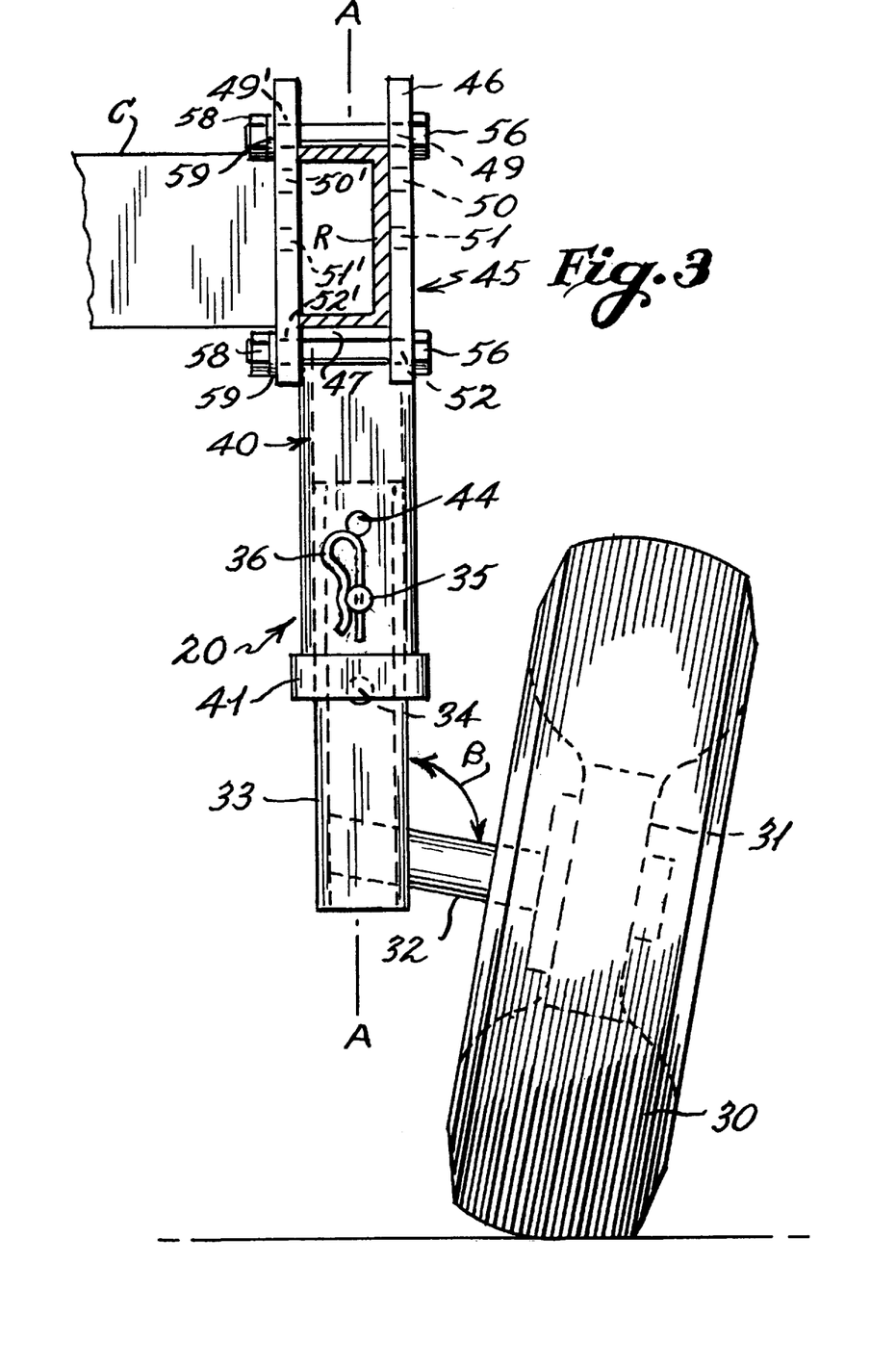
FIG. 3 is an enlarged view taken generally along line 3—3 of FIG. 2 showing the auxiliary wheel assembly of the present invention as it is clamped to the right frame member of the trailer.
Figure 4:
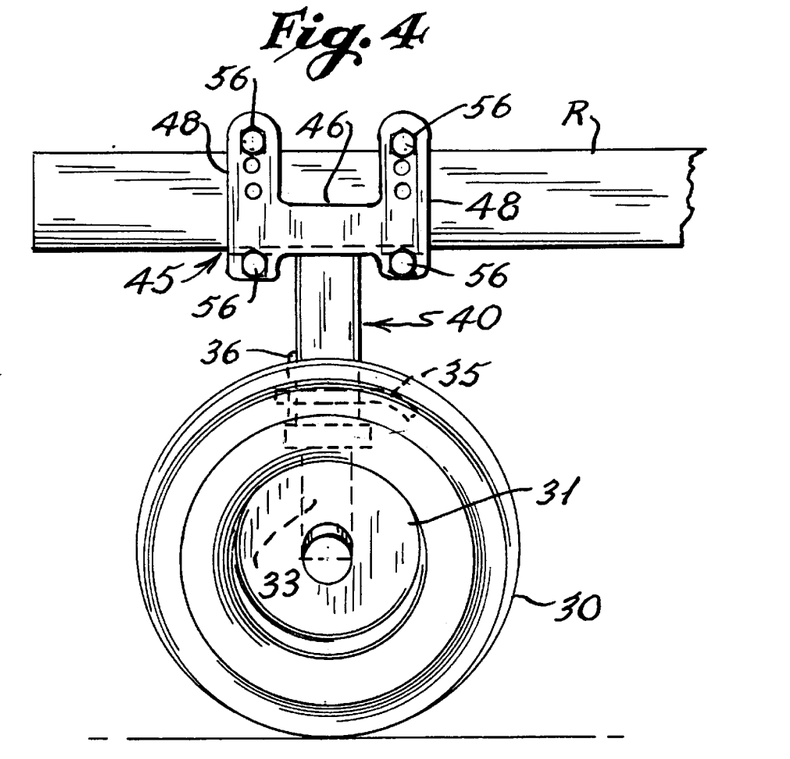
FIG. 4 is a front plan view of a first embodiment of auxiliary wheel assembly of the present invention mounted to the frame member shown in FIG. 2.

To mount the support tube to the frame member "R" in such a manner as to not change or adversely affect the integrity of the frame, the present invention utilizes a unique clamping system for securing the wheel assembly in operative position. Welded to or integrally formed with the upper portion 42 of the support tube 40 is an L-shaped mounting flange 45 having a vertical plate 46 and a horizontal plate 47 which extends across the upper end portion 42 of the support tube. In a preferred embodiment, the L-shaped member is formed of a piece of channel iron which may be configured as necessary and which is welded to the upper portion of the tube 40. As shown in FIG. 3, the vertical plate 46 is generally coextensive with the outer face of the adjacent side wall of the tube 40 and the horizontal flange 47 terminates generally flush with the face of the opposite side wall of the tube 40.

The trailer frame member "R" is shown as being generally C-shaped in cross-section as is conventional in many trailers. In some instances, the trailer frame member may be formed as a box beam. It is important to note that the size of the L-shaped flange and the tube 40 are such as to cooperatively receive the entire frame member "R" within the bounds of the L-shaped flange so that the horizontal portion 47 substantially co-terminates with the outer end or the outer side wall of the frame member.

Figure 5:
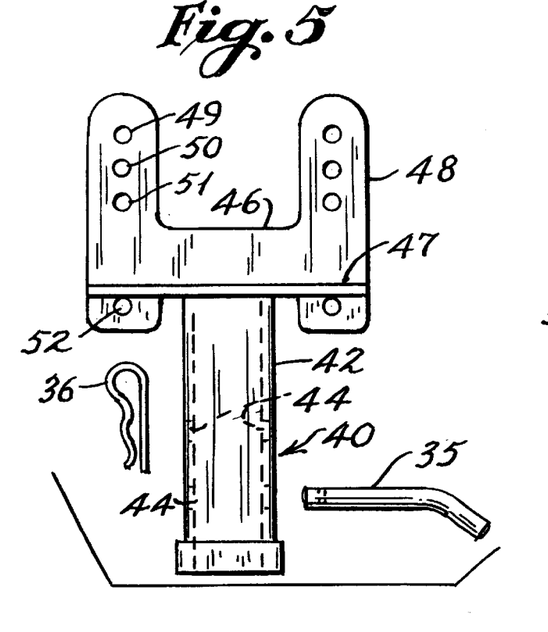
FIG. 5 is a rear elevational view of the support tube of the present invention as shown in FIG. 4.

With particular reference to FIG. 5, the particular configuration of the support tube and the L-shaped flange associated therewith are shown in greater detail. The L-shaped flange includes two generally parallel arms or segments 48, each of which has a plurality of upper openings 49, 50 and 51 created therein. The openings in each arm are generally aligned horizontally with respect to one another. A lower set of openings 52 are provided in the bottom or lower portion of each arm below the horizontal flange 47. The openings 49, 50 and 51 and their spacing relative to the lower openings 52 are specifically designed to allow the auxiliary wheel assembly of the present invention to be secured to various sizes of frame members "R". When the auxiliary wheel assembly is mounted to a frame, the clamping components are closely engageable relative to the top, sides and bottom of the frame member "R", as shown in FIG. 3, so as to prevent any relative twisting or movement of the clamping elements, and thus the assembly, relative to the frame when a load is applied to the wheel assembly in a manner as shown in FIG. 2.

As shown as FIG. 3, the spaced arms 48 extend upwardly along the inner flanges of the frame member "R" and in abutting relationship therewith. In this embodiment, the frame member is relatively large and therefore the openings 49 will be utilized for purposes of securing the auxiliary wheel assembly to the frame. The number of upper and lower openings may be varied as desired.

Figure 6:
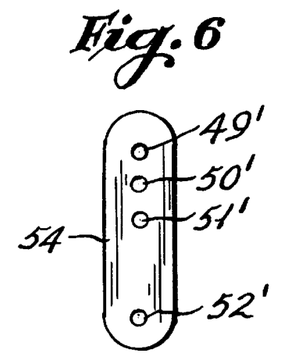
FIG. 6 is a front plan view of one of two clamping plates used in combination with the support tube of FIG. 5.
Figure 7:
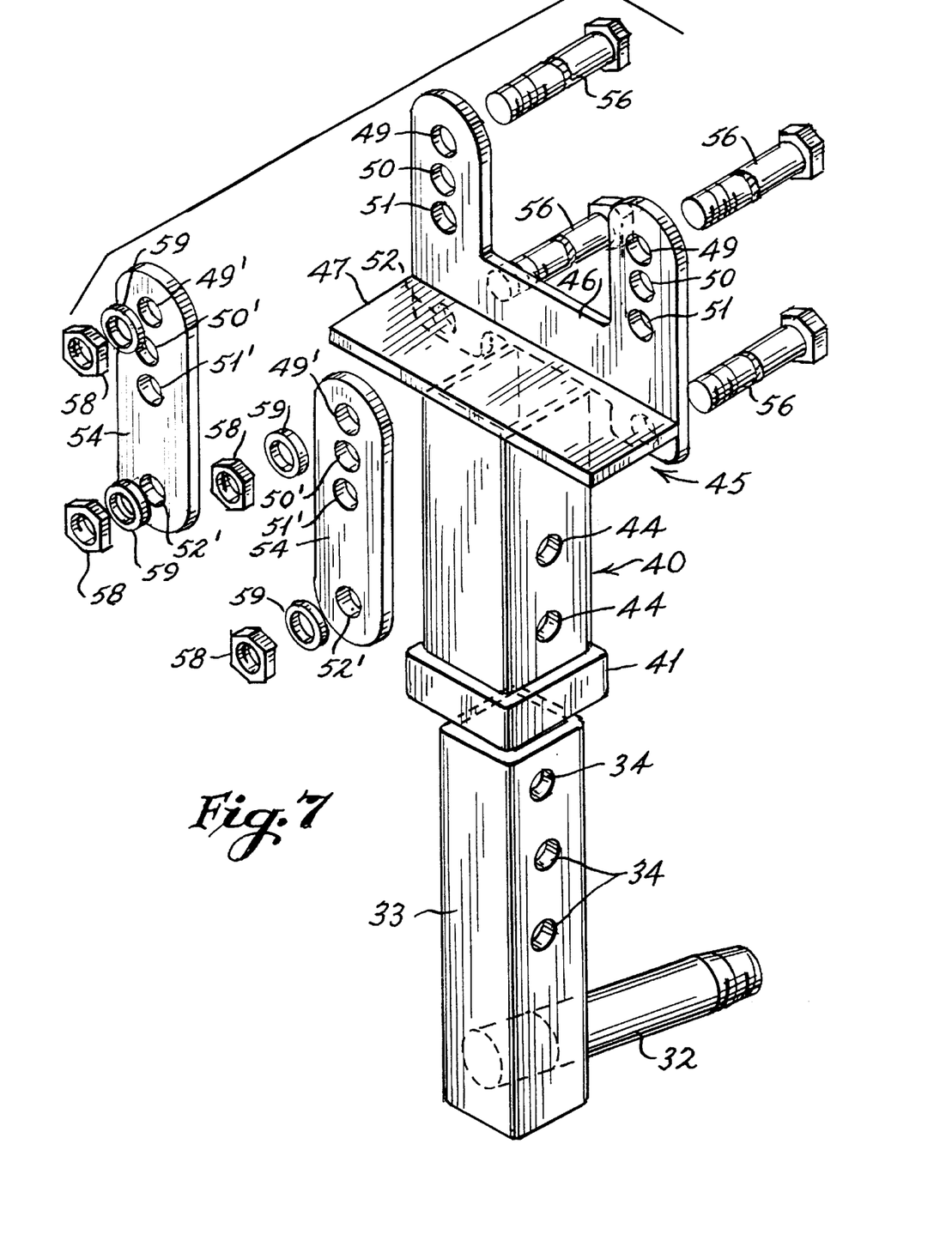
FIG. 7 is a rear perspective assembly view of the mounting tube, clamping plates and strut of FIGS. 3–6.
Figures 8, 9, 10:
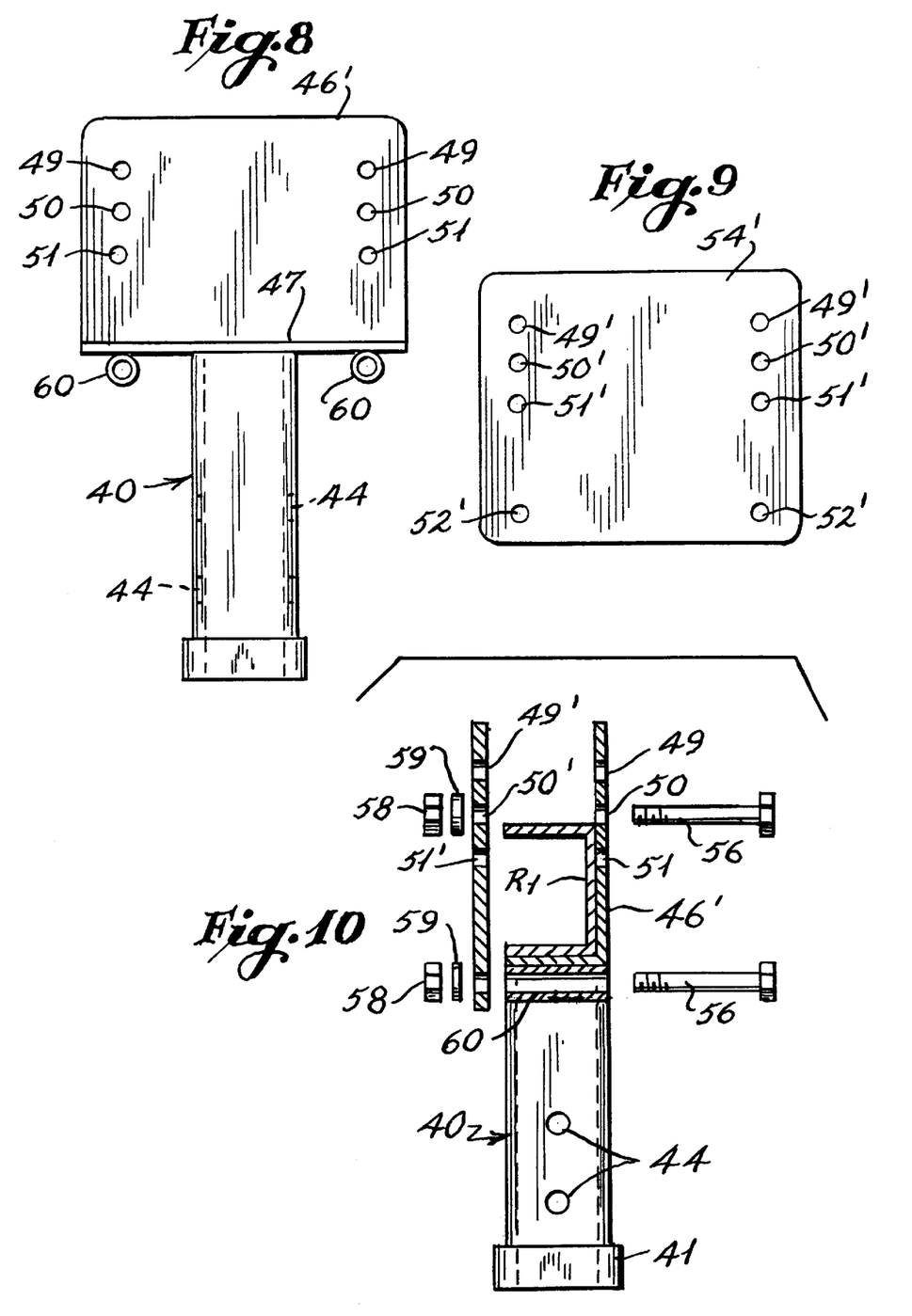
FIG. 8 is a rear elevational view of a second embodiment of support tube used in conjunction with the present invention.
FIG. 9 is a second embodiment of clamping plate utilized with the embodiment of support tube shown in FIG. 8.
FIG. 10 is a right side assembly view of the embodiment shown in FIGS. 8 and 9 illustrating the manner in which the elements are clamped relative to a frame member of a trailer.

To clamp the wheel assembly to the frame member, a pair of separate clamping plates 54 are provided, as shown in FIG. 6. Each of the clamping plates includes a plurality of spaced upper openings 49', 50' and 51' which are equally spaced relative to the openings 49, 50 and 51 in the arms 48 of the vertical component 46 of the L-shaped mounting flange 45. The clamping plates further include a lower opening 52' which is aligned with one of the openings 52 in the lower portion of the arms 48. The plates are positioned on the opposite side of the frame member "R" from the arms 48 and thereafter four mounting bolts 56 are inserted through the aligned openings so as to be immediately adjacent to the upper flange 22' of the frame member and immediately below the horizontal flange 47 of the L-shaped support 45. In some embodiments, the openings 49', 50' and 51' may be threaded so that the threaded outer ends of the bolts 56 may be threadingly engaged thereto. In the drawing figures, however, separate lock nuts 58 are shown as being secured to the outer threaded ends of the bolts 56. Appropriate lock washers 59 may also be utilized, as shown in FIG. 7. If a smaller frame member is encountered, the second lower set of openings 50 and 50' in both the arm segments 48 and the clamping plates 54 are used and receive the bolts 56 to secure the auxiliary wheel assembly to the frame. This arrangement is shown in FIG. 10. Likewise, a smaller frame would require that the bolts 56 be aligned through openings 51 and 51' and thereafter be secured in position.

One of the important features of the present invention is that when the frame member "R" is seated within the L-shaped support flange, the load of the frame is directed squarely, and aligned over, the entire width and generally aligned with the central axis A—A of the support tube 40, as shown in FIG. 3. This allows for a maximum load to be carried by the auxiliary wheel assembly without fear of distorting or bending the support tube, supporting flange or the strut 33.

A modification to the initial embodiment is disclosed in FIGS. 8 through 10. In this embodiment, the wheel, spindle, strut and support tube are essentially the same as previously described. In this embodiment, however, the L-shaped support flange 45' is formed of a continuous piece of channel iron having a single vertically extending backing plate 46' having a series of spaced and generally horizontally aligned openings 49, 50 and 51 therein as previously described. Welded beneath the horizontal flange 47 are a pair of spaced hollow sleeves 60 which extend substantially the full width of the flange 47. The sleeves 60 are hollow and receive the bolts 56 which pass between openings 52' formed in a single enlarged clamping plate 54', as shown in FIG. 9. The enlarged plate 54' also includes a plurality of horizontally spaced openings 49', 50' and 51' for purposes of selective mounting the auxiliary wheel assembly to different sizes of trailer frames.

With respect to FIG. 10, the support tube is mounted to a smaller frame member "R1". In this embodiment, the second set of openings 50 and 50' are used for receiving the bolts 56. The lower bolts 56 extend through the sleeves 60 and thereafter the bolts are secured in place as previously discussed utilizing the locking nuts 59.

It should be noted that the sleeves 60 may be utilized in the embodiment shown in FIGS. 1 through 7 to further provide structural rigidity for the auxiliary wheel assembly.

In the use of the auxiliary wheel assembly of the present invention, in the event a tire, wheel, bearing or axle of a conventional trailer becomes inoperative or damaged, the auxiliary wheel assembly is removed from a stowed position. As illustrated in FIG. 1, the wheel assembly may be mounted in an inverted relationship with respect to one of the frame members of the trailer with the wheel and tire being raised vertically above the frame and thereafter locked utilizing the locking pin. When it is necessary to place the auxiliary wheel assembly in use, it may simply be removed utilizing a conventional lug wrench. In this regard, it should be noted that the bolts 56 and nuts 26 are specifically designed to be of a size which is complementary to a conventional lug wrench so that no other tools are necessary to mount the assembly.

Before mounting the assembly to the frame, it is preferred that the strut 33 be inserted into the tubular support 40 and allowed to be slidable with respect thereto with the tire extending toward the ground. The strut may be retained temporarily in its most inwardly or upwardly orientation with respect to the support tube 40 by the locking pin 35. Thereafter, the L-shaped support flange is engaged against the bottom and one side of the frame member "R". The clamping plates are then aligned on the opposite side of the frame and the bolts 56 inserted through the appropriately aligned openings therein so as to closely embrace the frame, as shown in the drawing figures. Thereafter, a conventional jack may be utilized to elevate the conventional trailer wheels slightly off the travel surface, as shown in FIG. 2. The strut 33 may then be lowered into contact with the travel surface and locked into position to support the trailer with the conventional wheels elevated.

Because the four mounting bolts 56 and sleeve 60 substantially abut the upper and lower portions of the frame, even if one of the bolts were to become loose, the auxiliary wheel assembly will bind against the frame upon the forward or rearward motion of the towing vehicle. Thus, the auxiliary wheel assembly will not shift along the length of the frame when in use. In view of the foregoing, the present invention provides a unique auxiliary or spare wheel for trailers which includes an adjustable bracket system which clamps to a frame of a conventional trailer utilizing only a conventional lug wrench and wherein there is no adverse affect to the integrity of the frame caused by the use of the auxiliary wheel.

What is claimed is:

1. An auxiliary wheel assembly adapted to be selectively mounted to a frame member of a trailer in order to make the trailer roadworthy and wherein the frame member includes a bottom wall and at least one side wall, the auxiliary wheel assembly comprising:

a support member having upper and lower end portions and an elongated axis;

clamping means adapted to secure said support member to the frame member without adversely affecting the structural integrity of the frame member, said clamping means including a frame support portion, said frame support portion of said clamping means being generally L-shaped having a first portion extending generally parallel to said axis of said support member and adapted to engage the at least one side wall of the frame member and a second portion mounted to said upper end portion of said support member and extending generally Perpendicular to said axis and adapted to engage the bottom wall of the frame member, said clamping means further including at least one clamping plate opposing and spaced from said first portion of said frame support portion and fastener means adapted to extend exteriorly of the frame member for securing said clamping plate to said first portion of said frame support portion to thereby mount said auxiliary wheel assembly to the frame member;

a tire mounted to a wheel;

spindle means for connecting said wheel to a strut, said strut having at least one first opening therethrough, said support member including at least one second opening therethrough; and a locking pin member releasably mounted through aligned first and second openings in said strut and said support means for selectively securing said strut relative to said support member.

2. The auxiliary wheel assembly of claim 1 in which said spindle means is fixedly mounted to said strut so as to extend generally outwardly and downwardly therefrom at an angle greater than 90° relative to said strut when the auxiliary wheel assembly is mounted to the trailer frame member with said support means oriented vertically beneath the frame member.

3. The auxiliary wheel assembly of claim 2 in which said support member is a hollow tube, and said strut being telescopically adjustably mounted within said hollow tube.

4. An auxiliary wheel assembly for use with a trailer having a frame member, the auxiliary wheel assembly comprising:

a support member having upper and lower end portions and an elongated axis;

clamping means adapted to secure said support member to the frame member without adversely affecting the structural integrity of the frame member, said clamping means including a frame support portion mounted to said upper portion of said support means, said frame support portion of said clamping means including a generally L-shaped support flange having a first portion extending generally parallel to said axis of said support member and a second portion extending generally perpendicular to said axis, spaced openings in said first portion, said clamping means further including at least one clamping plate having upper and lower vertically spaced openings therein, and bolts extending through aligned openings in said at least one clamping plate and said first portion of said L-shaped support flange for securing said auxiliary wheel assembly to the frame member;

a tire mounted to a wheel;

spindle means connecting said wheel to a strut, said spindle means extending outwardly and downwardly relative to said strut at an angle of greater than 90° when the auxiliary wheel assembly is mounted to the trailer frame member with said support means oriented vertically beneath the frame member, said strut having at least one first opening therethrough, said support member including at least one second opening therethrough; and a locking pin member releasably mounted through aligned at least one first and second openings in said strut and said support member for selectively securing said strut relative to said support member.

5. The auxiliary wheel assembly of claim 4 in which said first portion of said L-shaped support flange includes upper and lower portions with said lower portion extending below said second portion of said L-shaped flange, two spaced sets of a plurality of upper openings in said upper portion of said first portion of said L-shaped flange and two spaced lower openings in said lower portion of said first portion of said L-shaped flange, and said at least one clamping plate having a plurality of vertically spaced upper openings and at least one lower opening, whereby the auxiliary wheel assembly may be mounted to different sizes of trailer frame members.

6. The auxiliary wheel assembly of claim 4 including a pair of hollow sleeves mounted below and to said second portion of said L-shaped support.

7. The auxiliary wheel assembly of claim 4 wherein said support member includes opposite side walls, said first portion of said L-shaped support flange extending generally flush with one of said opposite side walls and said second portion being substantially flush with the other of said opposite side walls.

8. The auxiliary wheel assembly of claim 7 including a plurality of vertically spaced first openings in said strut and a plurality of vertically spaced second openings in said support member.

9. The auxiliary wheel assembly of claim 8 in which said support member is a hollow tube, and said strut being telescopically adjustably mounted within said hollow tube.

10. The auxiliary wheel assembly of claim 4 in which said first portion of said L-shaped support flange and said at least one clamping plate each of a plurality of vertically spaced upper openings therein and said at least one clamping plate includes at least two lower openings therethrough, and a pair of said hollow sleeves mounted to and beneath said second portion of said L-shaped support flange through which a pair of said bolts are receivable and which pass through said at least two lower openings in said at least one clamping plate.

11. The auxiliary wheel assembly of claim 10 wherein said support member includes opposite side walls, said first portion of said L-shaped support flange extending generally flush with one of said opposite side walls and said second portion being substantially flush with the other of said opposite side walls.

12. The auxiliary wheel assembly of claim 11 including a plurality of vertically spaced first openings in said strut and a plurality of vertically spaced second openings in said support member.

13. An auxiliary wheel assembly for use with a trailer having a frame member including a bottom wall and at least one side wall, the auxiliary wheel assembly comprising:

a support member having upper and lower end portions and an elongated axis;

clamping means adapted to secure said support member to the frame member without adversely affecting the structural integrity of the frame member, said clamping means including a frame support portion;

said frame support portion of said clamping means being generally L-shaped having a first portion extending generally parallel to said axis of said support member and adapted to engage the at least one side wall of the frame member and a second portion mounted to said upper end portion of said support member and extending generally perpendicular to said axis and adapted to engage the bottom wall of the frame member, said clamping means further including at least one clamping plate opposing and spaced from said first portion of said frame support portion and fastener means adapted to extend exteriorly of the frame member for securing said clamping plate to said first portion of said frame support portion to thereby compress said at least one clamping plate and said first portion of said frame support portion relative to one another with the frame member therebetween to mount said auxiliary wheel assembly to the frame member a tire mounted to a wheel;

said wheel being rotatably connected to a strut, and said strut being connected to extend outwardly and downwardly from said support.

14. The auxiliary wheel assembly of claim 13 in which said first portion of said frame support portion of said clamping means includes spaced openings therein, said at least one clamping plate having upper and lower vertically spaced openings therein, and said fastener means for compressively forcing including bolts extending through aligned openings in said clamping plate and said first portion of said frame support portion for securing said auxiliary wheel assembly to the frame member.

15. The auxiliary wheel assembly of claim 14 in which said first portion of said frame support portion includes upper and lower portions, two spaced sets of a plurality of upper openings in said upper portion and two spaced lower openings in said lower portion.

16. The auxiliary wheel assembly of claim 13 including a pair of hollow sleeves mounted below and to said second portion of said frame support portion.

17. The auxiliary wheel assembly of claim 13 in which the auxiliary wheel assembly is adapted to be mounted to the trailer frame member with said support member oriented vertically beneath the frame member.

18. The auxiliary wheel assembly of claim 17 including a plurality of vertically spaced first openings in said strut and a plurality of vertically spaced second openings in said support member and a locking pin extendable through aligned first and second openings to secure said strut to said support member.

19. The auxiliary wheel assembly of claim 18 in which said support member is a hollow tube, and said strut being telescopically adjustably mounted within said hollow tube.

* * * * *